(12) United States Patent
Tuli (10) Patent No.: US 8,201,093 B2
(45) Date of Patent: Jun. 12, 2012

(54) METHOD FOR REDUCING USER-PERCEIVED LAG ON TEXT DATA EXCHANGE WITH A REMOTE SERVER

(76) Inventor: Raja Singh Tuli, Montreal (CA)

(*) Notice: Subject to any disclaimer, the term of this patent is extended or adjusted under 35 U.S.C. 154(b) by 739 days.

(21) Appl. No.: 12/261,579

(22) Filed: Oct. 30, 2008

(65) Prior Publication Data

US 2010/0115454 A1    May 6, 2010

(51) Int. Cl.
*G06F 15/00* (2006.01)
*G06F 13/00* (2006.01)
(52) U.S. Cl. ...................... 715/746; 715/744
(58) Field of Classification Search .......... 715/851–853, 715/740–746, 748, 734–737, 727–738
See application file for complete search history.

(56) References Cited

U.S. PATENT DOCUMENTS 7,627,648 B1 * 12/2009 Mehta et al. .................. 709/217
2008/0221900 A1 * 9/2008 Cerra et al. ................ 704/270.1

* cited by examiner

*Primary Examiner* — Kevin Nguyen (57) ABSTRACT

The present invention takes advantage of independent front-end and back-end processing schedules. On the back-end the data traffic is streamlined in order to optimize transfer speed, while on the front-end the user interface employs text boxes and other graphic-related resources to manage the display of information to the user. The user perceives the data entry as seamless and real-time, while the actual data transfer is restricted to the essential for the purpose of actual processing, which is performed by a remote server. The present invention thus reduces user perceived lag on data exchange with a remote server without requiring an actual increase on network transmission speed.

32 Claims, 3 Drawing Sheets

METHOD FOR REDUCING USER-PERCEIVED LAG ON TEXT DATA EXCHANGE WITH A REMOTE SERVER

FIELD OF THE INVENTION

The present invention, in one aspect, generally relates to means that allow the user to access the Internet and World Wide Web using a Portable Device that communicates with a remote server by means of a wireless network. More specifically, it discloses an interface display management method that reduces the lag perceived by the user of said Portable Device upon exchanging text data with said remote server. The present invention also contemplates a method to streamline the data transfer between said Portable Device and said remote server through a wireless network.

BACKGROUND OF THE INVENTION

Portable web access devices are characterized by a compromise between processing power and physical size or footprint. More specifically, the image rendering performance of such devices is typically worse than that of equivalent, non-Portable Devices. It is therefore common that the user experiences a delay upon using such portable web access devices to interact with remote servers and other computing devices across a wireless network. The problem is aggravated by the network speed itself, which can contribute a significant, additional delay. There is also a commercial hindrance involved, as the price charged for bandwidth use and the perceived slowness impart a sensation of poor cost-effectiveness to the user.

In many cases the amount of data circulated between the Portable Device and the remote server is unnecessarily large, which overburdens the network and unduly scales-up the Portable Device's data display and refreshing requirements.

The prior art of the present invention includes for example U.S. Pat. No. 7,356,570, by the same Inventor. Said prior art generally corresponds to a Portable Device that allows the user to access the Internet and World Wide Web through a small bandwidth, low speed wireless network.

Those aspects of the prior art which are essential for explaining the present invention are now presented. In order to overcome the compromise between processing power and physical size which characterizes portable web access devices, the prior art resorts to transferring part of the processing tasks from the Portable Device to a remote server. In the industry jargon, remote applications running in the server take over many tasks from the local applications running in the Portable Device. In a typical implementation of this principle, data input by the user in the Portable Device is transmitted in vector or ASCII information format to a Proxy server, where the data is processed. After processing the data, the Proxy server renders this corresponding output into bitmap format and sends it to the Portable Device. The Portable Device receives the bitmap transmission from the Proxy server and displays it in the Portable Device's screen.

The state of the art features inconveniences which are most noticeable when the user is typing in text data on the Portable Device. For instance, there is a noticeable lag between the moment the user strikes a key in the Portable Device's keyboard and the actual rendering of the typed key on the device's screen. This lag can be very distracting and also imparts a sensation of poor system performance to the user. The main cause of said lag is the circuitous route that the information runs across a typically clogged and slow wireless network. The vector or ASCII information input by the user must first travel to the remote Proxy server. Once there, the data is processed. After said processing, the output is converted into a corresponding bitmap image that must travel back through the wireless network to the Portable Device, where it is finally rendered on the screen. The problem can be compounded by frequent screen refreshing associated with continuous typing by the user. The lack of a data exchange management routine specifically dedicated to user text input results in inefficient use of the already small wireless bandwidth.

Consequently, there is a current need for reducing the user-perceived lag upon exchanging text data with a remote server as well as streamlining the data flow.

SUMMARY OF THE INVENTION

The present invention is directed towards reducing the delay perceived by the user upon performing data exchange with a remote server without actually investing in the upgrade of the wireless network speed.

In essence, the present invention corresponds to the integration of two methods. The first of said methods comprises the implementation of a Dynamic Local text box which runs in the Portable Device, with the user typing in the text data inside it. This method of text data collection significantly reduces the user-perceived lag upon entering text data by shortening the path said data must run from the moment the user types it until the moment it gets displayed to the user at the Portable Device.

The second method takes advantage of one operational feature of the Dynamic Local text box, namely the enablement/disablement for text entry. Said enablement/disablement events are used to trigger the actual exchange of information between the Portable Device and the Proxy server. This management of information exchange optimizes the use of bandwidth by reducing the volume of information actually exchanged between the Portable Device and the Proxy server during text data entry.

In one exemplary embodiment, the invention comprises a web server offering access to a website displaying a web page and a wireless network connecting said web page server to a remote Proxy server. Said Proxy server runs a web browsing application that includes Text Boxes. The Proxy server gets data from the web page server, rasterizes it and saves as a bitmap image of what would be the corresponding GUI display. The Proxy server then sends said bitmap image file across a wireless network to a Portable Device. The Portable Device receives the bitmap image and displays it on its screen for the user. A plurality of non-simultaneous instances of the Dynamic Local text box (L) is used to handle text entry on the Portable Device, performing periodic content exchanges with their uniquely corresponding Text Boxes (T) located in the Proxy server, where the actual data processing is performed.

It is therefore an object of the present invention to provide means for rendering the user's text data input on the Portable Device's GUI in a seamless, real-time fashion.

Another object of the present invention is to provide a method for handling user text data input in a way that allows minimization of the total time required to transfer a given amount of data.

Another object of the present invention is to ensure consistency of content between the Portable Device and the remote server in a timely fashion.

Another object of the present invention is to ensure that, in every instance of text data exchange, there is a bi-univocal correspondence between each text box graphic element addressed by the user on the Portable Device's GUI (Graphic User Interface) and its corresponding text data field in the remote server.

The above as well as additional features and advantages of the present invention will become apparent in the following written detailed description.

BRIEF DESCRIPTION OF THE DRAWINGS

A more complete understanding of the method of the present invention may be had by reference to the following detailed description when taken in conjunction with the accompanying drawings, wherein.

Where used in the various figures of the drawing, the same numerals designate the same or similar parts.

DETAILED DESCRIPTION

In order to eliminate ambiguities, some of the terms used in the following description will be now explained.

As used herein, the term "service provider's server" designates a computer that is separated from both the Portable Device and the Proxy server by a certain distance, and communicates with both by means of a network. All communication between the service provider's server and the Portable Device is performed through the Proxy server. In some cases the service provider's server provides access to the contents of a web page, in which case it is typically referred to as the web page server. As used herein, the term "web page server" designates a server that provides access to web page content—for instance Yahoo, CNN or similar ones—that is received by the invention's Proxy server, which rasterizes the data received from said web page server, compresses it and transmits to the Portable Device.

As used herein, the term "Proxy server" designates a computer that is separated from both the Portable Device and the service provider's server—for instance a web page server—by a certain distance and establishes the communication link between these by means of a network. The Proxy server typically runs applications—for instance a web browsing application—according to user-input instructions. The Proxy server is capable of receiving and transmitting both vector and raster data, and is capable of rasterizing vector data into bitmap images. The Proxy server communicates to other computers by means of a network.

As used herein, the term "Portable Device" designates an electronic device of reasonably small dimensions which function is to allow data entry by the user and to display information received from a Proxy server. The Portable Device has a CPU (Central Processing Unit) that is capable of rasterizing the text data input by the user in the Portable Device for displaying in the Portable Device's screen. The Portable Device is capable of receiving both vector and raster data and is capable of transmitting vector data. The Portable Device communicates to other computers by means of a network, typically through a Proxy server. The Portable Device is capable of decompressing the compressed bitmap image data received from the Proxy server, displaying it and also scrolling through the image if necessary. The Portable Device incorporates an integrated keypad.

A generic text box, text field or text entry box is a common element of the graphical user interface (GUI) of computer programs. A text box's purpose is to allow the user to input text information to be used by a program. A typical text box is a rectangle of convenient size, possibly with a border that separates the text box from the rest of the interface. Text boxes may contain zero, one, or two scrollbars. Some text boxes may display a blinking vertical line popularly known as cursor, indicating the current region of text being edited. It is common for the mouse cursor to change its shape when it hovers over a text box.

As used herein, the term "Text Box (T)" designates the back-end application operator involved in the actual processing of the user-input text data by an application which typically runs in a Proxy server. The corresponding front-end is the Dynamic Local text box (L) displayed by the Portable Device's GUI. The instance of the Dynamic Local text box (L) displayed in the Portable Device is a mere representation of its uniquely corresponding Text Box (T) that is in the Proxy server.

As used herein, the term "Dynamic Local text box (L)" designates a graphic element displayed by the Portable Device's GUI and overlaid on specific areas of the Portable Device's screen according to instructions received from the Proxy server. The user can input data to a Dynamic Local text box in the form of text or graphic symbols, as well as edit such data. The data input by the user typing on the Portable Device's integrated keypad may be rendered into the Dynamic Local text box by the Portable Device CPU and thus can be seen by the user in real-time.

As used herein, the terms "enable" and "disable" apply to the various instances of Dynamic Local text box (L) that are depicted as graphic elements in the Portable Device. An instance of the Dynamic Local text box (L) is said to be enabled when it is ready and capable of receiving the input text typed by the user on the Portable Device integrated keypad, which is then rendered by the Portable Device CPU in the Portable Device screen in real time. As used herein, the term "active" applies to one of the multiple different Text Boxes (T) that run in the Proxy server. A Text Box (T) is said to be active when it is ready and capable of receiving input text and processing it as per instructions of the web browsing application that runs in the Proxy server. Whenever a Text Box (T) is made active, a corresponding instance of the Dynamic Local text box (L) is enabled. Whenever an instance of the Dynamic Local text box (L) is disabled, it's corresponding Text Box (T) in the Proxy server loses its active status.

As used herein, the term "Current Active Text Box" designates the specific Text Box (T) in the web browser application running in the Proxy server presently selected for data entry.

As used herein, the term "Typing Interruption Prompt" designates a specific signal that the Portable Device broadcasts whenever the user signals that typing into an instance of the Dynamic Local text box is complete.

The user of the Portable Device accesses the Internet and World Wide Web, being said access performed using a communication network and always through a Proxy server.

The Proxy server informs the Portable Device whether the application being run at the website is a web browsing application or an electronic mail application. The Portable Device uses this preliminary information to select the operation mode of the Portable Device command keys. Depending on the operation mode selected, the response to command keys such as ENTER and TAB is different. If the website informs that the application being run there is an electronic mail application, the Portable Device operates in e-mail mode until the browser informs that the application being run is a web browsing application or the device is switched off. For the description of the invention features it will be assumed that the application being run at the Proxy server is a web browsing application, with the Portable Device accordingly running in web browsing mode. The differences for running in e-mail mode will be described further down.

Therefore, let's assume the user calls up an application on the Portable Device with the intention of navigating to a certain web page. The user can call up this application by typing in the URL of the web page. Another way to do it is clicking on an icon displayed at the Portable Device screen.

The Portable Device does not keep any information regarding icons on the image depicted on its screen. It is only capable of identifying when any of said graphic screen icons is clicked upon based on comparing their graphic display coordinates with those of a click performed by the user on the Portable Device. In the present example, this is what actually happens when the user clicks on a graphic icon displayed at the Portable Device screen: The Portable Device sends to the Proxy server the graphic display coordinates of the point clicked by the user, and only this information is transmitted from the Portable Device across the network to the Proxy server. Upon receiving said coordinates information, the Proxy server establishes that the click corresponds to the position of a browser application graphic icon in the Proxy server's virtual display, and reacts by duly initiating an instance of said browser that from then on is running in the Proxy server. This pattern is repeated for each and every click the user performs on the Portable Device screen: the Portable Device relays to the Proxy server the graphic display coordinates of each of the user clicks, and the Proxy server bases its following action on said received coordinates on a case by case basis.

The Proxy server does the actual accessing of the web page, which is hosted at the service provider's server, to which the Proxy server is connected by the network. The web page server transmits to the Proxy server the contents of the accessed web page. The Proxy server then loads up the corresponding initial page on its virtual display, and from then on the website is being navigated by the instance of the browser running in the Proxy server.

The image of the web page is rasterized and compressed by the Proxy server, and sent in blocks—known as frames—to the Portable Device for display to the user as background image. This routine is performed again every time the navigation causes the loading of a new web page on the Proxy server virtual display, with the image frames of the newly accessed web page replacing those of the previous one at the screen of the Portable Device.

As seen from the Portable Device perspective, the next thing to happen after the user has called navigation to a new web page is that the Portable Device receives from the Proxy server the compressed bitmap image frames corresponding to the contents of said web page. This image frames are decompressed by the CPU of the Portable Device and displayed on the screen, being thereinafter kept as a background image.

The interaction between the user and a web page (or an electronic mail application window) typically involves the input of data by the user. The standard means for that is a text box which allows the user to perform text entry or editing. During navigation the user is presented a series of different web pages, and most of these feature at least one text box. In cases where two or more text boxes are featured in the same web page it becomes necessary to define active status to ensure proper addressing of any user input. In the context of the present invention, a text box is said to be active when it is ready and capable of receiving input text and processing it according to instructions of the browser application. In order to prevent addressing mistakes, only one text box is active in any given web page at any one time, and active status is removed from one text box before it is assigned to a different text box. Therefore we may speak of a text box having active status at a given moment as being the current active text box. Each of the text boxes featured by the various web pages accessed during navigation is characterized by unique features such as graphic location, size, preliminary contents and preliminary cursor position.

The conventional manner of text entry into an active editable text box is said to be direct and immediate when the text is entered using a human interface device (for instance a keyboard) connected by wired or wireless means to a computer in close proximity where the browsing application is being run. The transmission distance is said to be short and the rendering of the input text on the display of the computer is said to be immediate. The user sees every character typed being rendered at the screen with no perceptible delay.

The present invention's use of a Portable Device which the user employs both to type in the text and to visualize the web page (or electronic mail application window) with the browsing (or e-mail application) actually running on a distant Proxy server entails some inconvenience regarding user perceived delay. Compared to the conventional manner described in the previous paragraph, the distance involved in the transmission of the ASCII or vector text code from the Portable Device to the Proxy server is long. Once the data sent from the Portable Device reaches the Proxy, it is processed by the browser application and the output must still be sent back to the Portable Device, where it is rendered by the CPU of the Portable Device and displayed in the screen for the user. The transmission to and from the Proxy server is subject to possible delays because of the distance itself as well as intermediary connections such as servers, hubs, satellites and similar devices. The transmission of the typed text across the wired or wireless connection and through these intermediary devices can therefore entail delay, which can be detected by the user as an interval between the moment a key is typed on the Portable Device integrated keypad and its actual rendering on the Portable Device screen.

The distance separating the Portable Device from the Proxy server is large enough to prevent the user from directly visualizing what goes on at the Proxy server. More specifically, the distance prevents direct visual access to the contents of the text boxes in the various web pages displayed by the browser application at the Proxy server during navigation. According to the present invention, the user is capable of seeing said text boxes by means of a graphic representation that is presented in the Portable Device screen. In order to differentiate between a text box in the Proxy server and its graphic representation in the Portable Device, the first is herein termed Text Box (T) and the latter Dynamic local Text Box (L).

The Dynamic local Text Box (L) is created by software run by the CPU in the Portable Device. Whenever a Text Box (T) is made active in the Browsing software running at the Proxy server, the Proxy server sends to the Portable Device the information including the graphic location, size, previous contents and preliminary cursor position of said currently active Text Box (T). These information items are also sent to the Portable Device by default whenever the web browsing causes the loading of a new web page on the Proxy server and said page features a Text Box (T) that is already active by default when the web page is accessed. The case in which a newly accessed web page does not have a default active Text Box (T) will be addressed in detail further below.

Upon receiving the information transmitted from the Proxy server, the CPU of the Portable Device is able to display on its screen an instance of the Dynamic Local Text Box (L) that represents the current active Text Box (T). The Dynamic Local Text Box (L) is displayed on the Portable Device screen on the same place where the Text Box (T) is positioned on the virtual display of the Proxy server, being temporarily overlaid on the background image of the web page previously displayed at the Portable Device screen. Thus the Dynamic Local Text Box (L) allows the user to visualize in the Portable Device screen the contents of the Text Box (T) which is currently active at the Proxy server, at the same graphic location originally intended for depiction by those that designed the web page.

Any text data previously stored in a Text Box (T) is sent from the Proxy server to its corresponding instance of the Dynamic Local text box (L) in the Portable Device as vector or ASCII information and is rendered therein by the CPU of the Portable Device immediately upon reception.

As described before, one web page at the Proxy server may incorporate two or more different Text Boxes (T). The representation of this aspect in the Portable Device is achieved by having a different instance of the Dynamic Local Text Box (L) for each different Text Box (T) at the Proxy server. For the sake of clarity, we speak of an index "n" to relate them, with each different Text Box ($T_n$) at the Proxy server being represented in the Portable Device by a different instance of the Dynamic Local Text Box ($L_n$). Moreover, each different Text Box ($T_n$) at the Proxy server is uniquely associated to its corresponding Dynamic Local Text Box ($L_n$) by their set of graphic display coordinates.

No two different Text Boxes ($T_n$) are ever simultaneously active in the Proxy server. Likewise, an instance of the Dynamic Local Text Box ($L_n$) is only displayed at the screen of the Portable Device while its corresponding Text Box ($T_n$) is active at the Proxy server, and thus no two instances of the Dynamic Local Text Box (L) are ever simultaneously displayed in the Portable Device.

Besides allowing the user to visualize in the Portable Device screen the contents of the Text Box (T) that is currently active at the Proxy server, the Dynamic Local Text Box (L) also serves as a "portal" through which the user can input text to the Text Box (T) that is in the Proxy server.

The Dynamic Local text box (L) is temporarily, graphically overlaid on the area of the Portable Device screen where the text that the user types must be displayed, which corresponds to the graphic position of its uniquely associated Text Box (T) in the Proxy server virtual display, thus following the display instructions for depiction where originally intended by those that designed the web page. The CPU of the Portable Device renders each character inside said Dynamic Local text box (L) immediately once typed. The user perceives no delay between typing and seeing each character rendered in the Portable Device screen. The use of a graphic representation of the Text Box (T) in the Portable Device itself thus circumvents the problem of the perceived delay on text rendering caused by the use of indirect, remote text entry means characteristic of the present invention.

An instance of the Dynamic Local text box (L) is said to be enabled when it is ready and capable of receiving the text typed in by the user on the Portable Device integrated keypad. For as long as an instance of the Dynamic Local text box (L) in the screen of the Portable Device is enabled, the CPU of the Portable Device renders in it any text input by the user using the device's keypad; as soon as said instance of the Dynamic Local text box (L) is disabled, no further input text is rendered there. Said disablement is brought about in a manner which will be addressed further down.

Figure 7:
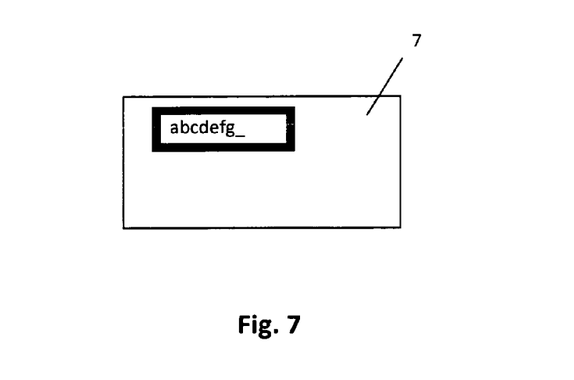
FIG. 7 is a drawing illustrating the graphic aspect of a Dynamic Local text box (L) with different color outline and blinking cursor, which lasts for as long as it's corresponding Text Box (T) is the current active text box.

The displaying of an instance of the Dynamic Local Text Box (L) offers the user of the Portable Device an indication of the availability and readiness of means to input text to the browser application being run in the Proxy server. Said indication is made more evident by the highlighting of the perimeter of the Dynamic Local text box (L) in a different color when it is enabled. An example of said highlighting is depicted by FIG. 7.

The graphic display in a different color helps the user to differentiate between that and other areas of the Portable Device screen where text input and edition is not presently available. However, the different color perimeter with which the enabled instance of the Dynamic Local text box (L) is depicted is not a permanent feature, being said feature removed or the color changed as soon as said particular instance of the Dynamic Local text box (L) is disabled.

The text input to the Dynamic Local text box (L) is typically performed with the visual aid of a text cursor. Information on the preliminary positioning of the text cursor inside every instance of the Dynamic Local text box (L) is included with the information sent by the Proxy server upon instructing the display of said Dynamic Local text box (L) in the Portable Device screen. Depending on attributes previously set for each different Text Box (T) at the Proxy server—for example the size of the text box, its function in the context of that particular page, etc.—the preliminary cursor position automatically defaults to either the end or the beginning of any text previously present in the box. Optionally the cursor inside the Dynamic Local text box (L) blinks to further signal the readiness to receive input text. The characters typed in by the user are rendered in the position indicated by the cursor at the time of their typing.

When the user navigates to a new web page, the web page server transmits the contents of said web page to the browser application running in the Proxy server. The web page transmitted to the Proxy server typically includes one or more text boxes, some text and background images, and one of the text boxes—herein termed the primary text box—is typically preactivated by default. The cases in which there is no previously activated primary text box in the newly accessed web page are addressed further below.

According to the present invention, whenever there is at least one text box on the web page, the transmission of said primary text box from the Proxy server to the Portable Device is assigned priority over the remaining content of the web page. The transmission priority order comes into play, for example, when network congestion imposes a lag on the communication between the web page server and the Proxy server. The contents of a web page must first be transmitted from the web page server to the Proxy server, where said contents are loaded, rasterized, compressed and then transmitted to the Portable Device in frames. A clogged network could cause a delay in the loading of the complete web page on the web browser that runs in the Proxy server, and that would force the user to sit and wait for the displaying of the graphic representation of said primary text box on the Portable Device before being able to input data and start interacting with the web browser. The present invention's transmission priority order circumvents this inconvenience by having the Proxy server reporting the graphic location, size, previous contents and preliminary cursor position of the primary text box to the Portable Device as soon as it receives this specific information from the web page server, thus making text entry available for the user at the Portable Device as soon as possible by means of the corresponding instance of Dynamic Local text box (L). Typically the Proxy server starts its transmission to the Portable Device by relaying the image content from the web page server as soon as it starts receiving it. According to the present invention, that action is continued until the web page server reports to the Proxy server the graphic location, size and preliminary cursor position of a text box, which is typically the primary text box for that particular web page. When that happens, the Proxy server interrupts transmission of the web page image content right away and sends the primary text box graphic location, size, contents and preliminary cursor position to the Portable Device. Once the transmission of the information regarding said primary text box is completed, the Proxy server continues to relay the remainder of the web page content information. Said priority order is enforced for every transmission of a newly accessed web page from the Proxy server to the Portable Device.

The case in which there is no previously activated primary text box in the newly accessed web page will now be addressed. The Portable Device receives from the Proxy server the compressed bitmap image frames corresponding to the contents of said newly accessed web page. This image frames are decompressed by the CPU of the Portable Device and displayed on the screen. The one or more Text Boxes (T) included in the page are displayed as part of the image, although none of them has active status so far, which means the user sees no enabled instance of the Dynamic Local text box (L) in the Portable Device screen where text can be input right away. The activation of a Text Box (T) is triggered by the user, and is brought about by the user clicking anywhere inside the graphic display limits of the image of the desired Text Box (T) on the Portable Device screen. When the user performs said click, the graphic coordinates are transmitted to the Proxy server. Upon analyzing said coordinates the Proxy server is able to establish that the click corresponds to a certain Text Box (T), and reacts by sending to the Portable Device the information on graphic location, size, preliminary contents and preliminary cursor position that allows the display of the corresponding instance of the Dynamic Local text box (L) at the Portable Device screen. Seen from the point of view of the user, once the graphic image of the chosen Text Box (T) is clicked, it is rapidly replaced by a superimposed instance of its corresponding Dynamic Local text box (L), with the highlighting of the perimeter in a different color indicating that it is enabled and ready for typing.

Any text typed in by the user while no instance of the Dynamic Local text box (L) is enabled is automatically stored in a data buffer implemented in the Portable Device's memory. Once text data is input on the buffer memory, it is held in memory until it is either inserted into an enabled instance of the Dynamic Local text box (L) in the Portable Device or discarded. The purpose of said data buffer is to ensure continuous collection of user-input data regardless of the short-term unavailability of an enabled instance of the Dynamic Local text box (L) in the Portable Device, for instance while the Current Active status is being moved from one Text Box (T) to another in the Proxy server. As soon as the next Text Box (T) gains active status, the text stored in the data buffer is rendered by the Portable Device CPU into its corresponding, consequently enabled instance of the Dynamic Local text box (L) at the Portable Device. The management of data in said buffer is thus straightforward, and the buffer is continually ready to receive input.

Although the user sees the text being displayed on the instance of the Dynamic Local text box (L) in the Portable Device overlaid on the web page image, for now the user input text is being rendered in the Portable Device only, and none of it has so far reached its corresponding Text Box (T) at the Proxy server.

Actual transmission of the data typed in by the user on an instance of the Dynamic Local text box (L) from the Portable Device to its corresponding Text Box (T) in the Proxy server is delayed until the user signals that typing in that particular instance of the Dynamic Local text box (L) is complete. Let us assume for example that the user is presently entering text onto Dynamic Local text box (L1) on the Portable Device, which is associated to Text Box (T1) in the Proxy server. The user may signal that said typing is complete by performing one of two actions:

clicking on any point on the Portable Device screen which graphic display coordinates fall outside of the boundaries of the Dynamic Local text box (L1); or     pressing the "Enter" command key on the Portable Device's integrated keypad, or otherwise selecting or indicating the "TAB" key, "Enter" key, "Text Insert" key or an equivalent command to the browser application running at the Proxy server.

Either of these two actions will cause what is herein termed a Typing Interruption Prompt. The consequences of triggering a Typing Interruption Prompt while the Dynamic Local text box (L1) is enabled are now detailed for both the Portable Device and Proxy server, for each of the possible variations of the two actions disclosed above.

Pressing of a Command Key on the Portable Device

The consequences of pressing the "TAB" command key available in the Portable Device's integrated keypad are quite specific as it amounts to selecting the next text box on a web page. The description of the following paragraphs is valid for all other command keys found on the Portable Device's integrated keypad except the "TAB" command key, which shall be described separately, further below.

It is important to differentiate between command keys and function keys. Function keys trigger events in the Portable Device itself, whereas command keys cause the sending of the corresponding command from the Portable Device to the Proxy server.

On the Portable Device, the pressing of a command key—either using a standard key on the Portable Device's integrated keypad or screen keys on a touch-sensitive screen—immediately disables and blocks any further text input to the Dynamic Local text box (L1), with further text being diverted to the buffer memory. The Dynamic Local text box (L1) looses the highlighting of its perimeter in a different color. The current vector or ASCII content of Dynamic Local text box (L1) is transmitted to the Text Box (T1) in the Proxy server. The command key pressing causes the sending of the corresponding command from the Portable Device to the browser application running in the Proxy server immediately after the ASCII content is sent to the Proxy server.

On the Proxy server, the currently active Text Box (T1) receives the vector or ASCII content of Dynamic Local text box (L1) and the browsing application performs the command indicated by the command key selected by the user.

The consequences of the performance of said command by the web browser can be either the update of the content of Text Box (T1) on the Proxy server or the navigation to a new web page. Each of these two alternatives will be detailed in the next two paragraphs.

In case of an update in the content of Text Box (T1) in the Proxy server, said update can result from the placing of the content received from the Dynamic Local text box (L1) in the previously empty Text Box (T1). In case the Text Box (T1)

already has previous content, it is merged with the content received from the Dynamic Local text box (L1), thus yielding an updated content for the Text Box (T1). Either way, the Proxy server converts said updated content of the Text Box (T1) into a bitmap image and sends it to the Portable Device to be displayed in the screen. Upon receiving said image, the Portable Device CPU overlays it on the graphic display area of the screen occupied by the presently disabled Dynamic Local text box (L1) originally used for data input. Thereafter said image of the updated content of Text Box (T1) is incorporated into the background image displayed in the Portable Device screen.

In case the performance of the command received from the Portable Device results in the web browser navigating to a new page in the website, everything happens as described above for the initial access to the website: The web page server transmits to the Proxy server the contents of the new accessed web page; the Proxy server then loads up said new page, converts the content into a bitmap image that is transmitted to the Portable Device as a replacement for the one displayed in the Portable Device screen until then, with transmission priority granted to the information for displaying the primary text box for this new web page. The Portable Device screen thus replaces the previous image displayed by that of the newly accessed web page, with an enabled instance of the Dynamic Local text box (L) displayed for the user with its perimeter highlighted in a different color as soon as the information required for its enablement is received from the Proxy server.

Clicking on a Command Button on the Portable Device Screen

When the user clicks on a point of the Portable Device screen which graphic display coordinates correspond to those of a virtual command key, for instance a "search" button, a "Go" button or any other virtual button featured in the web page (as opposed to keys on the keypad or screen keys on a touch-sensitive screen), the corresponding command is not transmitted from the Portable Device to the Proxy server. Instead, the graphic display coordinates of the click are transmitted to the web browser in the Proxy server and then the Browser recognizes the click as an indication that the user wants the selected command to be performed.

On the Portable Device, the CPU compares the graphic coordinates of the click to those of the Dynamic Local text box (L1) and recognizes the clicking on a command button on the screen as a click outside the boundaries of the Dynamic Local text box (L1). The Dynamic Local text box (L1) is disabled and any further text input to it is immediately blocked, with further text being diverted to the buffer memory. The Dynamic Local text box (L1) looses the highlighting of its perimeter in a different color. The current vector or ASCII content of the Dynamic Local text box (L1) is transmitted to the Text Box (T1) in the Proxy server. After that, the graphic display coordinates of the clicked point are sent to the browser application running in the Proxy server.

On the Proxy server, the currently active Text Box (T1) receives the vector or ASCII content of Dynamic Local text box (L1). Once the graphic display coordinates of the clicked point are received and recognized by the browsing application as an indication of a certain command, the browsing application performs said command.

The consequences of the performance of said command by the web browser can be either the update of the content of Text Box (T1) or the navigation to a new web page. Each of these alternatives has already been detailed above on the item "Pressing of a command key on the Portable Device".

Clicking on Neither a Text Box nor a Command Button

When the user clicks on a point of the Portable Device screen which graphic display coordinates correspond to neither a text box nor a command button the graphic display coordinates of the click are transmitted to the web browser in the Proxy.

On the Portable Device, the CPU compares the graphic coordinates of the click to those of the Dynamic Local text box (L1) and recognizes the clicking on the screen as a click outside the boundaries of the Dynamic Local text box (L1). The Dynamic Local text box (L1) is disabled and any further text input to it is immediately blocked, with further text being diverted to the buffer memory. The Dynamic Local text box (L1) looses the highlighting of its perimeter in a different color. Should there be any previous text stored in the Portable Device buffer memory at this point, it would be discarded. The current vector or ASCII content of Dynamic Local text box (L1) is transmitted to the Text Box (T1) in the Proxy server. After that, the graphic display coordinates of the clicked point are sent to the browser application running in the Proxy server.

On the Proxy server, the currently active Text Box (T1) receives the vector or ASCII content of Dynamic Local text box (L1). Once the graphic display coordinates of the clicked point are received and recognized by the browsing application as neither falling inside the boundaries of a different Text Box (T) nor being an indication of a command, the Proxy server performs the update of the content of the Text Box (T1). As described before, said update results from the merging of the content received from the Dynamic Local text box (L1) with any previous content of the Text Box (T1). The Proxy server converts said updated content of the Text Box (T1) into a bitmap image and sends it to the Portable Device to be displayed in the screen. Upon receiving said image, the Portable Device CPU overlays it on the graphic display area of the screen occupied by the presently disabled Dynamic Local text box (L1) originally used for data input. Thereafter said image of the updated content of Text Box (T1) is incorporated into the background image displayed in the Portable Device screen.

Clicking on Another Text Box

On the Portable Device, the CPU compares the graphic coordinates of the click on the screen to those of the Dynamic Local text box (L1) and recognizes the clicking as having been performed outside the boundaries of the Dynamic Local text box (L1). The Dynamic Local text box (L1) is disabled and any further text input to it is immediately blocked, with further text being diverted to the data buffer implemented in the Portable Device's memory. The Dynamic Local text box (L1) looses the highlighting of its perimeter in a different color. The current vector or ASCII content of Dynamic Local text box (L1) is transmitted to the Text Box (T1) in the Proxy server. The graphic display coordinates of the point clicked in the Portable Device are sent to the browser application running in the Proxy server immediately after the ASCII content is sent to the Proxy server.

On the Proxy server, the currently active Text Box (T1) receives the vector or ASCII content of Dynamic Local text box (L1). Once the graphic display coordinates of the point clicked on the Portable Device screen are received by the browsing application running in the Proxy server, it establishes that said coordinates correspond to those of a point that lies inside the graphic display boundaries of Text Box (T2) in the Proxy server. This causes the immediate removal of current active status from Text Box (T1) followed by granting of current active status to Text Box (T2).

The Proxy server processes the update of the content of Text Box (T1). As described before, the update results from the merging of the content received from the Dynamic Local text box (L1) with any previous content of the Text Box (T1). The Proxy server converts said updated content of the Text Box (T1) into a bitmap image and sends it to the Portable Device to be displayed in the screen. Upon receiving said image, the Portable Device CPU overlays it on the graphic display area of the screen occupied by the presently disabled Dynamic Local text box (L1) originally used for data input. Thereafter said image of the updated content of Text Box (T1) is incorporated into the background image displayed in the Portable Device screen.

The granting of current active status to Text Box (T2) causes the Proxy server to send to the Portable Device the information regarding graphic location, size, previous vector or ASCII contents and preliminary cursor position of the Text Box (T2). Upon receiving said information, the CPU of the Portable Device displays the corresponding Dynamic Local text box (L2), duly enabled and ready to receive text. Any previous vector or ASCII content of the Text Box (T2) is rendered by the CPU of the Portable Device in the Dynamic Local text box (L2) immediately upon reception. This previous content is rendered in the Dynamic Local text box (L2) in the exact same position it was in the currently active Text Box (T2) in the Proxy server.

Any text input by the user during the period between the disablement of Dynamic Local text box (L1) and enablement of Dynamic Local text box (L2) in the Portable Device is stored by the data buffer implemented in the Portable Device's memory. As soon as the Dynamic Local text box (L2) is enabled, the content stored in the buffer is removed from the buffer and rendered by the CPU into the Dynamic Local text box (L2). The user sees the enabled Dynamic Local text box (L2) in the screen of the Portable Device with its perimeter highlighted in a different color and ready for typing, already containing any text previously featured in the corresponding Text Box (T2) in the Proxy server followed by any content that was temporarily stored in the Portable Device buffer memory since the disablement of Dynamic Local text box (L1). Once these two sources of content are exhausted, the next portion of text to be rendered inside the Dynamic Local text box (L2) is any text typed in by the user after the enablement of the Dynamic Local text box (L2), which is rendered there in real time, at the position indicated by the cursor.

Pressing of the "TAB" Key on the Portable Device

The consequences of pressing the "TAB" command key available in the Portable Device's integrated keypad are quite specific as it amounts to selecting the next text box available on a web page, wherein "next" refers to the line of priority according to instructions of each specific web page configuration as relayed by the browser on the Proxy server.

On the Portable Device, the pressing of the "TAB" command key immediately disables and blocks any further text input to the Dynamic Local text box (L1), with further text being diverted to the buffer memory. The Dynamic Local text box (L1) looses the highlighting of its perimeter in a different color. The current vector or ASCII content of Dynamic Local text box (L1) is transmitted to the Text Box (T1) in the Proxy server. The TAB command key pressing causes the sending of the corresponding TAB command from the Portable Device to the browser application running in the Proxy server immediately after the ASCII content is sent to the Proxy server.

On the Proxy server, the currently active Text Box (T1) receives the vector or ASCII content of Dynamic Local text box (L1). The reception of the TAB command from the Portable Device causes the immediate removal of current active status from Text Box (T1) followed by granting of current active status to Text Box (T2) chosen according to the hierarchic configuration of the web page.

The Proxy server processes the update of the content of Text Box (T1). As described before, the update results from the merging of the content received from the Dynamic Local text box (L1) with any previous content of the Text Box (T1). The Proxy server converts said updated content of the Text Box (T1) into a bitmap image and sends it to the Portable Device to be displayed in the screen. Upon receiving said image, the Portable Device CPU overlays it on the graphic display area of the screen occupied by the presently disabled Dynamic Local text box (L1) originally used for data input. Thereafter said image of the updated content of Text Box (T1) is incorporated into the background image displayed in the Portable Device screen.

The granting of current active status to Text Box (T2) causes the Proxy server to send to the Portable Device the information regarding graphic location, size, previous vector or ASCII contents and preliminary cursor position of the Text Box (T2). Upon receiving said information, the CPU of the Portable Device displays the corresponding Dynamic Local text box (L2), duly enabled and ready to receive text. Any previous vector or ASCII content of the Text Box (T2) is rendered by the CPU of the Portable Device in the Dynamic Local text box (L2) immediately upon reception.

Any text input by the user during the period between the disablement of Dynamic Local text box (L1) and enablement of Dynamic Local text box (L2) in the Portable Device is stored by the data buffer implemented in the Portable Device's memory. As soon as the Dynamic Local text box (L2) is enabled, the content stored in the buffer is removed from the buffer and rendered in the Dynamic Local text box (L2). The user sees the enabled Dynamic Local text box (L2) in the screen of the Portable Device with its perimeter highlighted in a different color and ready for typing, already containing any text previously featured in the corresponding Text Box (T2) in the Proxy server followed by any content that was temporarily stored in the Portable Device buffer memory since the disablement of Dynamic Local text box (L1).

Once every instance of the Typing Interruption Prompt is fully described, it is worth pointing out that no matter how it is triggered, the Typing interruption Prompt causes the transmission of the current content of the Dynamic Local text box (L1) in the Portable Device to the Text Box (T1) in the Proxy server.

Clicking Inside the Boundaries of the Enabled Dynamic Local Text Box (L1) on the Portable Device An option that has not yet been addressed is the clicking inside the boundaries of the enabled Dynamic Local text box (L1), which does not cause a Typing Interruption Prompt. On the Portable Device, the CPU compares the graphic coordinates of the click to those of the Dynamic Local text box (L1) and recognizes it as a click inside the boundaries of the enabled Dynamic Local text box (L1). Depending on the coordinates of the click, the text cursor inside the Dynamic Local text box (L1) might be repositioned. The Dynamic Local text box (L1) remains enabled as before. Further text input by the user continues to be displayed in the Dynamic Local text box (L1) as before, with the typed characters being rendered by the CPU of the Portable Device in real time. No information is sent from the Portable Device to the Proxy server at this point, and the Text Box (T1) remains the current active text box in the Proxy server as before.

As discussed before, the Proxy server informs the Portable Device whether the application being run at the website is a web browsing application or an electronic mail application, and the Portable Device uses this preliminary information to select the operation mode of the Portable Device command keys.

ENTER Command

In e-mail operation mode, the indication of the ENTER command key causes a Typing Interruption Prompt, but does not disable the Dynamic Local text box (L) or block further text entry in it. The Dynamic Local text box (L) remains enabled and with its perimeter highlighted in a different color. When the ENTER command is indicated, the vector or ASCII content of Dynamic Local text box (L) added since the previous indication of the ENTER command is transmitted from the Portable Device to the Text Box (T) in the Proxy server. Inside the Dynamic Local text box (L) the cursor moves to a new paragraph.

On the Proxy server, the currently active Text Box (T) receives the vector or ASCII content of Dynamic Local text box (L), with the consequent update resulting from the placing of the content received from the Dynamic Local text box (L) in the Text Box (T). In case the Text Box (T) already has previous content, it is merged with the content received from the Dynamic Local text box (L); otherwise the received content is simply incorporated in the active Text Box (T). Either way, although the active Text Box (T) is updated, the Proxy server does not send any feedback to the Portable Device at this time.

TAB Command

In e-mail operation mode, the TAB command key behaves differently depending on the field of the e-mail application where the cursor is. If the cursor is inside the e-mail text message field, the indication of the TAB command simply adds five space characters to the typed text. For all other fields, the TAB command works exactly as described in the web browsing mode as described earlier.

In some cases, for example during the use of an electronic mail application window to write an e-mail message, the amount of text contained in a single Text Box (T) in the Proxy server might become relatively large. This way, when the Text Box (T) is activated for a second time for further text input, the whole of its current text content must be sent to the corresponding Dynamic local text box (L) in the Portable Device for display too the user. In order to avoid unnecessary transmission of large amounts of ASCII or vector text code from the Portable Device to the Proxy server, the present invention offers the optional embodiment in which only a fraction of the ASCII content of said Text Box (T) is actually transmitted to the Dynamic Local text box (L) in the Portable Device. The choice of said fraction is made on the basis of the current position of the text cursor. It is assumed that the user is likely to input further text where the cursor was left on the last time this particular Text Box (T) was active, and that any possible editions are bound to be performed in the phrases that are near the current cursor position. Just like described before, the user is capable of entering freshly typed text in real time in the Dynamic Local text box (L), and upon signaling that the typing is complete—by any of the above described options of Typing Interruption Prompt—the newly revised content of the Dynamic Local text box (L) is transmitted to the Text Box (T) in the Proxy server, which replaces the exact portion of text previously sent over to the Portable Device by this corresponding revised version received from the Portable Device.

Should the assumption that the user wishes to edit around the current cursor position prove mistaken, that is, if after receiving the chosen portion of the content of the Text Box (T) in the Portable Device's Dynamic Local text box (L) the user chooses to scroll either up or down and eventually hits the upper or lower limit of said chosen text portion, the Portable Device transmits to the Proxy server the information that the user has "hit" the top or bottom limit of the last portion of ASCII transmitted. The Proxy server then transmits to the Portable Device another portion of the content of Text Box (T), this time selected around either the top or bottom limit of the previous portion sent, and with the cursor repositioned according to where the user left it in the Portable Device's Dynamic Local text box (L) before triggering the Typing Interruption Prompt. Seen from the perspective of the user on the Portable Device, the events unfold as follows: When the user scrolls either up or down and causes the cursor to reach the limits of the editable text displayed in the Dynamic Local text box (L), the CPU of the Portable Device detects said event and reacts by transmitting to the Proxy server the information that either the top or bottom limit was hit. The current vector or ASCII content of Dynamic Local text box (L) is transmitted to the Text Box (T) in the Proxy server, and the Dynamic Local text box (L) temporarily displays an hour glass symbol while this information is being relayed to the Proxy server. Once the newly selected portion of the content of Text Box (T) reaches the Portable Device, it is rendered by its CPU inside the Dynamic Local text box (L), allowing the user to proceed with normal edition and/or text input on this newly selected portion of the text box content.

Another aspect of the present invention is the implementation of scroll-bars on the text boxes. Depending on the situation, an instance of the Dynamic Local text box (L) might incorporate zero, one or two scroll bars to accommodate the text input by the user. The scroll bars are analogous to those known in the state of the art: The options are a vertical scroll bar which allows for additional lines of text to be added in a space made viewable by rolling across the display area vertically, or a horizontal scroll bar which allows for longer lines of text to be displayed in a space made viewable by rolling across the display area horizontally. In both cases the scroll bar serves the purpose of allowing the display of a larger amount of text than would otherwise be permitted by the initial choice of features such as text box graphic dimensions, font size and spacing. The user may operate the scroll bars by clicking on one of them, by holding down the mouse button over the arrow icon on either end of the bar or by dragging the sliding tab icon in the desired direction. Just like the rendering of the text in the screen, the scrolling action is performed by the software resident and running on the CPU of the Portable Device.

The present invention's implementation of such scroll bars is particular in the aspect that the introduction of scroll bars may be triggered either by the Portable Device or the Proxy server. When the implementation of the scroll bars is decided by the Portable Device, the data reporting its features is sent to the Proxy server along with the next transmission of input text data from the instance of the Dynamic Local text box (L) to its corresponding Text Box (T) in the Proxy server, which as described is performed as soon as a Typing Interruption Prompt is detected. Conversely, when the implementation of the scroll bars is decided by the Proxy server, the data reporting its features is sent to the Portable Device along with the standard information regarding graphic location, size, previous contents and preliminary cursor position for displaying the corresponding instance of the Dynamic Local text box (L).

There is also a relative scaling aspect of the graphic coordinates' conversion that affects the relation between the Text Box (T) in the Proxy server and its corresponding Dynamic Local text box (L) in the Portable Device. The Dynamic Local text box (L) created by the software resident and running on the CPU of the remote device may be slightly smaller or slightly larger than the image of the Text Box (T) in the Proxy server. The size and location of the Dynamic Local text box (L) is relative to and dependant on the size and location of its corresponding Text Box (T). Relative to and dependent on, in this case, refers to the existence of a correlation in size and location between the Text Box (T) in the Proxy server and its corresponding Dynamic Local text box (L) in the Portable Device. The correlation in size may be one of matching to a certain degree of precision, or one of ratio. The correlation of location may be one of matching to a certain degree of precision, or one of relative position with regards to chosen points of reference, which points of reference may be existing elements on the original web page or be created either by the browser software resident and running on the Proxy server, or by the software resident and running on the CPU of the Portable Device.

Another aspect of the present invention is the management of the fonts used by the Portable Device CPU to render the text inside the Dynamic Local text box (L). While a given instance of the Dynamic Local text box (L) is enabled, the fonts used to render text in it are determined by the Portable Device. Upon detection of a Typing Interruption Prompt, no further text is rendered in that particular instance of the Dynamic Local text box (L), yet the font used to depict it is still the one determined by the Portable Device. As soon as the corresponding Text Box (T) in the Proxy server receives the text input, said input is processed by the web browser application and the corresponding output is sent back to the Portable Device in the form of a bitmap image. As soon as said image is received, the Portable Device's GUI displays it on the graphic display area previously occupied by the instance of the Dynamic Local text box (L), but this time the font used is the one selected by the web page browser that is running on the Proxy server. Therefore the change in font serves as yet another indication of the active status of a text box in the Portable Device.

Although each instance of the Dynamic Local text box (L) in the Portable Device is uniquely associated with its corresponding Text Box (T) in the Proxy server, their contents are not necessarily the same over the course of time, being equalized only at discrete, specific moments. This feature of the present invention reduces the total volume of data transmitted across the network.

Each different Text Box (T) in the Proxy server continually stores information regarding text box size, graphic display coordinates, current data content and preliminary cursor position. In contrast, an instance of the corresponding Dynamic Local text box (L) stores just the data typed in by the user or sent to it by the Proxy server or by the Portable Device memory buffer, storing said data only while that particular instance is enabled. This feature of the present invention reduces the processing demands on the Portable Device CPU.

An example of the invention will now be described with reference to the figures. The figures are intended to be illustrative rather than limiting and are included herewith to facilitate the explanation of the invention.

Figure 1:
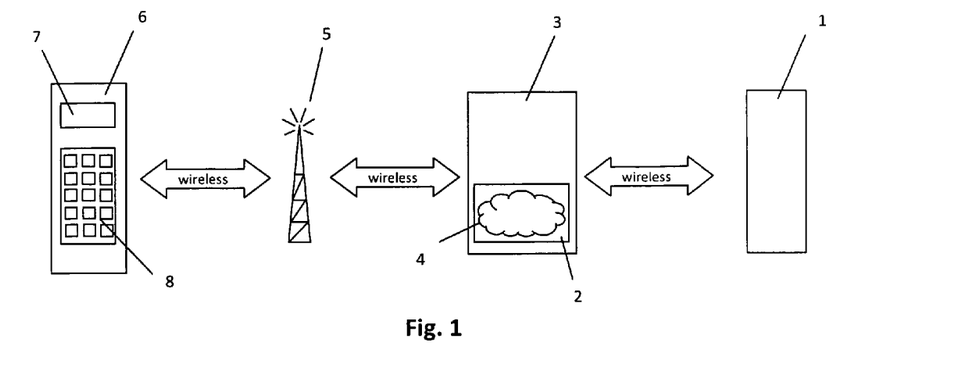
FIG. 1 is a schematic drawing illustrating the basic elements and the flow of data between them according to the present invention.

One embodiment of the present invention is disclosed in FIG. 1, in which the user of the Portable Device navigates through the Internet and World Wide Web using a browsing software running at the Proxy server. A service provider's server (1) offers access to a web page. A wireless network connects said web page server (1) to a remote Proxy server (2) located in a server farm (3). Said Proxy server (2) is running a web browsing application (4), which gets data from the web page server (1) and saves a bitmap image of what would be the corresponding GUI display for that website initial page. The Proxy server (2) then sends said bitmap image file across a wireless network, for instance passing through a cellular telephone link (5), to a Portable Device (6). The Portable Device (6) receives the bitmap image and displays it on its screen (7). The Portable Device (6) also incorporates an integrated keypad (8).

The subjacent concept of the present invention is illustrated on FIGS. 2, 3, 4, 5 and 6, where the content of the local text box ($L_n$) rendered in the screen (7) of the Portable Device (6) is simultaneously depicted along with the content of its equivalent Text Box ($T_n$) in the web browsing application (4) that is running inside the Proxy server (2).

Figure 2:
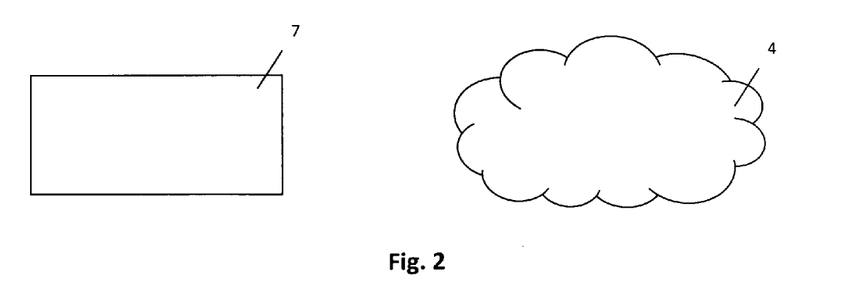
FIGS. 2 to 6 are schematic drawings illustrating the simultaneous contents of various instances of the Dynamic Local text box (L) rendered in the Portable Device and their equivalent Text Boxes (T) in the Proxy server.

On the situation illustrated on FIG. 2, the user has initiated an instance of the web browsing application (4) on the Proxy server (2). For the example illustrated, the initial page of this particular web browsing application (4) does not have any text box in it. The Portable Device (6) has just received the initial page's bitmap image and renders it on its screen (7). No instance of Text Box (T) is activated in the web browsing application (4) of the Proxy server (2) and no instance of the Dynamic Local text box (L) is enabled in the screen (7) of the Portable Device (6).

Figure 3:
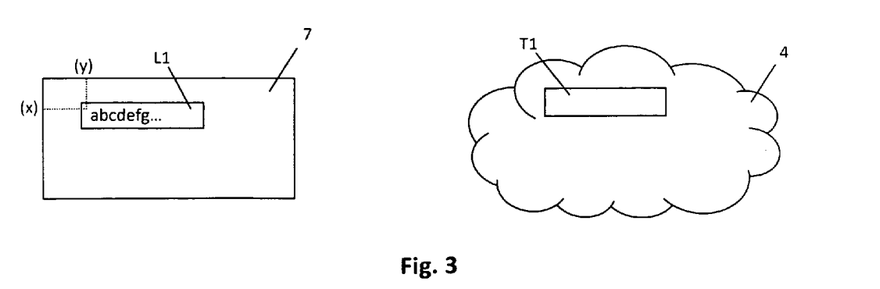

On the subsequent situation illustrated on FIG. 3, the user has used the mouse to click on a point (x, y) in the screen (7) of the Portable Device (6). The Portable Device transmitted the graphic coordinates (x, y) to the Proxy server (2). For the example at hand, these correspond to a Text Box (T1), and the Proxy server (2) response to the user clicking was first to Assign Current Active Status to Text Box (T1), and then send its graphic location and size information to the Portable Device (6). The Portable Device (6) used the information of graphic location and size to display and enable the corresponding Dynamic Local text box (L1). The reporting of the graphic location and size of Text Box (T1) establishes for the GUI of the Portable Device (6) the graphic boundaries of the user text input area, which is the enabled Dynamic Local Text Box (L1). Any text eventually typed in by the user, for as long as (L1) remains enabled, is thereafter addressed to the Text Box (T1) that actually receives and processes the text data on the Proxy server (2). On the Portable Device (6), the GUI draws the Dynamic Local text box (L1) in a different color over the previously received background image that was originally displayed, and then proceeds to render the user input text inside (L1) in real time, with each character being rendered immediately once input. From the user's point of view the text entry appears to be occurring in real time, including any editions. However at this time the Portable Device (6) is only rendering the newly added contents in (L1), without actually transmitting said text data to the corresponding Text Box (T1) at the Proxy server (2). The Portable Device (6) will only transmit the newly added vector or ASCII information to the Proxy server (2) upon detecting a Typing Interruption Prompt.

Figure 4:
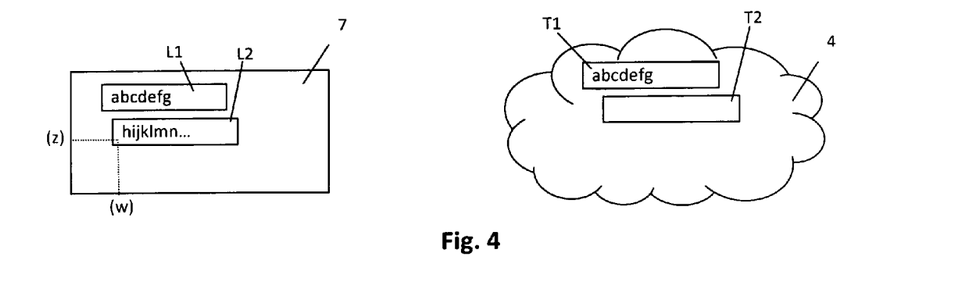

On the subsequent situation illustrated on FIG. 4, the user has just used the mouse to click on a point (z, w) in the screen (7) of the Portable Device (6). For the example at hand, these coordinates correspond to a second Text Box (T2), and thus the clicking triggers a Typing Interruption Prompt. The Proxy server (2) response to the user clicking is to:
  remove current active status from Text Box (T1) in the Proxy server (2);
  disable Dynamic Local text box (L1) in the Portable Device;
  trigger the transmission of the newly added text data typed in (L1) from the Portable Device (6) to its corresponding Text Box (T1) in the Proxy server (2);

send to the Portable Device (6) a raster image of (T1) depicting it's full string of user-typed text, overlaying it at the place in the screen (7) of the Portable Device (6) previously occupied by the Dynamic Local text box (L1);

assign current active status to Text Box (T2) and send it's graphic location, size and preliminary cursor position to the Portable Device (6) plus any text already present in it;

enable, on the Portable Device (6), a Dynamic Local text box (L2). Any text data previously stored in a Text Box (T2) is sent from the Proxy server to the Dynamic Local text box (L2) in the Portable Device as vector or ASCII information and is rendered therein by the CPU of the Portable Device immediately upon reception.

Just as before, any text data eventually typed in by the user, for as long as (L2) remains enabled, is rendered by the CPU of the Portable device on the screen (7).

Any text typed in by the user between the disablement of the Dynamic Local text box (L1) and the enablement of the Dynamic Local text box (L2) is stored in the buffer memory (9) of the Portable Device and rendered in the Dynamic Local text box (L2) once enabled, right after the rendering of any previous content received from the proxy server. That is well illustrated on FIGS. 5a and 5b.

Figure 5A:
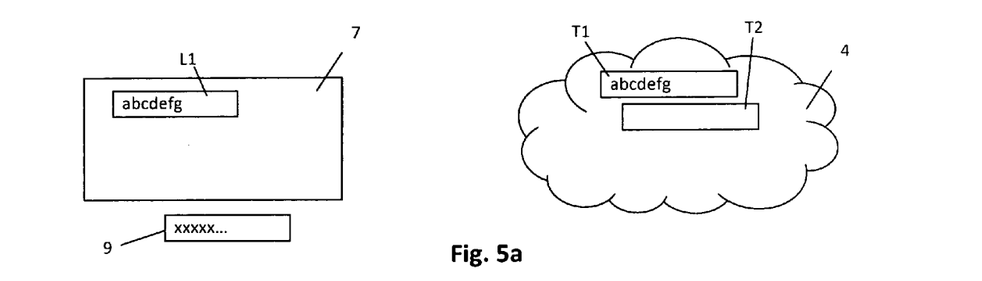

On the subsequent situation illustrated on FIG. 5a, the user has started to type in text immediately after having clicked on the local text box (L2), but before said local text box (L2) had been enabled. In other words, the user has been typing in a certain amount of text during the lag caused by removing the Current Active Text Box status for (T1) and transferring it to (T2). During this lag, any text typed in by the user is automatically stored in the present invention's data buffer (9), which is located inside the Portable Device and stores said data in a temporary fashion while no instance of the Dynamic Local text box (L) is enabled. The data buffer (9) ensures continuous collection of user-input data regardless of the possible lag occurring when the Current Active status is being moved from one Text Box (T) to another.

Figure 5B:
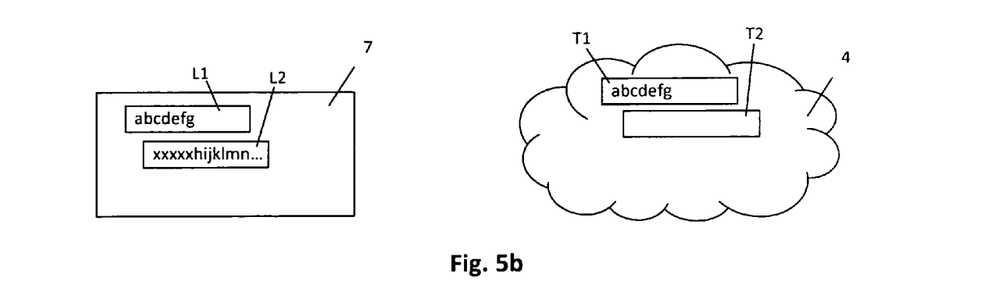

On the subsequent situation illustrated on FIG. 5b, the Dynamic Local text box (L2) has just been enabled. As soon as the local text box (L2) is enabled, the text stored in the data buffer (9) is rendered into it, right after any possible previous content sent over by the Proxy server. Any following text typed in by the user from that point on is added to the Dynamic Local text box (L2) in real time, with each character being rendered immediately once input, but without actually transmitting the text data to the Proxy server (2). As a result, once the Dynamic Local text box (L2) has been enabled the user does not perceive any lag in text input.

Figure 6:
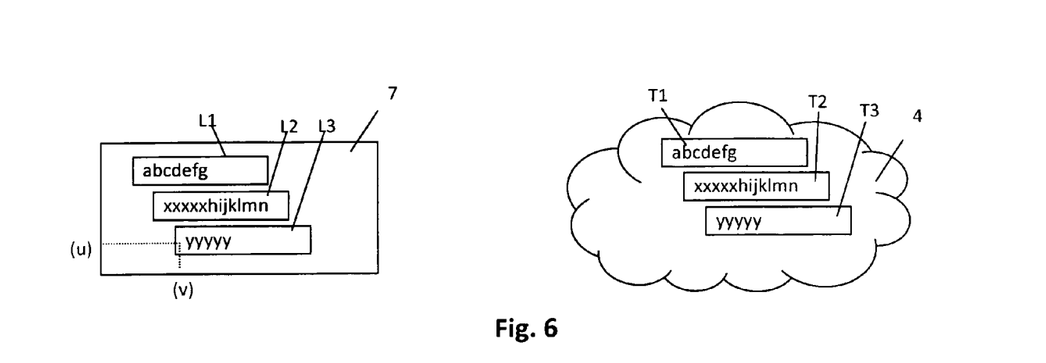

On the subsequent situation illustrated on FIG. 6, the user has just used the mouse to click on yet another point (u, v) in the screen (7) of the Portable Device (6), this time positioned in an area corresponding to a third text box (T3) of the Proxy server. For this text box the GUI of the Portable Device (6) already illustrates some existing text, typed in a previous opportunity. The clicking triggers a Typing Interruption Prompt. The Proxy server (2) response is to:

remove current active status from Text Box (T2) in the Proxy server (2);

disable Dynamic Local text box (L2) in the Portable Device;

trigger the transmission of the newly added text data typed in (L2) from the Portable Device (6) to its corresponding Text Box (T2) in the Proxy server (2);

send to the Portable Device (6) an image of (T2) depicting it's full string of user-typed text, overlaying it at the place in the screen (7) of the Portable Device (6) previously occupied by the local text box (L2);

assign current active status to Text Box (T3) and send it's graphic location and size to the Portable Device (6) plus the text data already present in text box (T3);

enable, on the Portable Device (6), a local text box (L3). Any text data previously stored in a Text Box (T3) is sent from the Proxy server to the Dynamic Local text box (L3) in the Portable Device as vector or ASCII information and is rendered therein by the CPU of the Portable Device immediately upon reception. Any text possibly stored in the buffer (9) is then rendered after it, and from then on any further text typed by the user is added to the Dynamic Local text box (L3) in real time, with each character being rendered immediately once input.

The present invention provides numerous advantages over the prior art. Besides reducing user perceived lag on text data exchange with the Proxy server, it minimizes the amount of data circulated between the portable device and the Proxy server to the bare essential, avoiding unnecessary overburden of the network as well as super-dimensioning of the portable device's data display and refreshing requirements. The image refreshing is performed only for those areas of the portable device's GUI where actual changes occurred.

In more general terms, the present invention takes advantage of independent front-end and back-end processing schedules. The state of the art relies on the continuous, reciprocal updating routine between the front-end text image, displayed at the portable device's GUI, and the back-end text box (T) in the application that is being run at the Proxy server. In contrast, the present invention replaces the front-end display with a local text box (L) overlaid on the previously received background image that is displayed on the screen of the portable device (6). Thus it provides means for display of the user's text data input on the portable device's GUI in a seamless, real-time fashion. Furthermore, it streamlines the frequency of the updates between the front end text image and back end remote application to a bare minimum, without delaying either the Proxy server processing of the text data or the display of the typed text by the portable device.

While this invention has been particularly shown and described with reference to a preferred embodiment, it will be understood by those skilled in the art that various changes in form and detail may be made therein without departing from the spirit and scope of the invention. The invention in its broadest, and more specific aspects, is further described and defined in the claims which now follow.

I claim:

1. Method for reducing user-perceived lag on text data exchange with a remote server, in which a Proxy server running an application which GUI image features a Text Box (T) rasterizes, compresses and sends to a Portable Device an image which includes a representation of said Text Box (T), being said image displayed with the aid of a software application running on the Portable Device, and whenever said Text Box (T) is active said software that creates and enables an instance of a Dynamic Local text box (L) which is displayed on the Portable Device screen on graphic display coordinates that correspond to those of the Text Box (T) in the Proxy server, with a package containing information regarding the size, graphic display coordinates, current data content and preliminary cursor position for creating said instance of the Dynamic Local text box (L) being sent from the Proxy server to the Portable Device, with said instance of the Dynamic Local text box (L) remaining enabled until the detection of a Typing Interruption Prompt.

2. Method according to claim 1, in which as long as an instance of the Dynamic Local text box (L) in the screen of the Portable Device is enabled, any text input by the user is rendered in it by the CPU of the Portable Device, and as soon as said instance of the Dynamic Local text box (L) is disabled, no further input text is rendered there.

3. Method according to claim 1, in which the enabled status of the Dynamic Local text box (L) is signaled by the highlighting of the perimeter of the Dynamic Local text box (L) in a different color, which is changed as soon as that particular instance of the Dynamic Local text box (L) is disabled.

4. Method according to claim 1, in which the enabled status of the Dynamic Local text box (L) is signaled by the presence of a blinking cursor inside the Dynamic Local text box (L), with the characters typed in by the user being rendered in the position indicated by the cursor at the time of their typing.

5. Method according to claim 1, in which whenever there is at least one text box on the web page, the transmission of information concerning said primary text box from the Proxy server to the Portable Device is assigned priority over the remaining content of the web page.

6. Method according to claim 1, in which if an instance of the Dynamic Local text box (L) is enabled, clicking on any point on the Portable Device screen which graphic display coordinates fall outside of the boundaries of said Dynamic Local text box (L) causes a Typing Interruption Prompt.

7. Method according to claim 1, in which pressing the ENTER command key on the Portable Device's integrated keypad, or otherwise selecting or indicating the TAB key, the ENTER key, the TEXT INSERT key or an equivalent command to the browser application running at the Proxy server causes a Typing Interruption Prompt.

8. Method according to claim 1, in which transmission of the data typed in by the user on an instance of the Dynamic Local text box (L) from the Portable Device to its corresponding Text Box (T) in the Proxy server is delayed until the user signals that typing in that particular instance of the Dynamic Local text box (L) is complete by causing a Typing Interruption Prompt.

9. Method according to claim 1, in which a Typing Interruption Prompt event triggers the transmission of input text from the Portable Device to the Proxy server.

10. Method according to claim 1, in which if an instance of the Dynamic Local text box (L) is enabled, pressing of a command key on the Portable Device causes a Typing interruption Prompt.

11. Method according to claim 1, in which if an instance of the Dynamic Local text box (L) is enabled, clicking on a command button on the Portable Device screen causes a Typing Interruption Prompt.

12. Method according to claim 1, in which if an instance of the Dynamic Local text box (L) is enabled, clicking on neither a text box nor a command button causes a Typing interruption Prompt.

13. Method according to claim 1, in which if an instance of the Dynamic Local text box (L) is enabled, clicking on another text box causes a Typing Interruption Prompt.

14. Method according to claim 1, in which if an instance of the Dynamic Local text box (L) is enabled, pressing of the TAB key on the Portable Device causes a Typing Interruption Prompt.

15. Method according to claim 1, in which the Portable Device features a data buffer that temporarily stores input by the user whenever data is input while no instance of the Dynamic Local text box (L) is enabled, being the data buffer continually ready to receive input.

16. Method according to claim 1, in which the data buffer featured in the Portable Device stores any text typed by the user from the moment a Typing Interruption Prompt is issued until the moment an instance of the Dynamic Local text box (L) is enabled on the Portable Device, whereupon the data content stored in the buffer is rendered therein by the CPU of the Portable Device and erased from the buffer memory.

17. Method according to claim 1, in which any text data previously stored in the Text Box (T) upon its activation is sent to the corresponding instance of the Dynamic Local text box (L) in the Portable Device as vector or ASCII information and is rendered by the CPU of the Portable Device immediately upon reception.

18. Method according to claim 1, in which in the absence of a currently active Text Box (T) in the Proxy server, a click by the user on a point of the Portable Device screen which graphic display coordinates correspond to any point inside the boundaries of a Text Box (T) in the Proxy server triggers the activation of said Text Box (T), followed by the enablement in the Portable Device of an instance of the Dynamic Local text box (L) which graphic location, size, preliminary contents and preliminary cursor position correspond to those of said Text Box (T).

19. Method according to claim 1, in which once the Text Box (T) in the Proxy server receives the input data from its corresponding instance of the Dynamic Local text box (L) in the Portable Device it processes the data, stores the output of said processing, prepares a bitmap image of said output and sends said image back to the Portable Device for displaying to the user, being said routine performed whenever a Typing Interruption Prompt is detected.

20. Method according to claim 1, in which after a Typing Interruption Prompt, once the Portable Device receives the bitmap image corresponding to the updated content of the Text Box (T), said image replaces the display area occupied by the instance of the Dynamic Local text box (L) originally used for data input and is thereafter incorporated into the background image displayed in the Portable Device screen.

21. Method according to claim 1, in which any instance of the Dynamic Local text box (L) in the Portable Device screen is uniquely associated with its corresponding Text Box (T) in the Proxy server by means of their graphic display coordinates.

22. Method according to claim 1, in which the activation of a Text Box (T) in the Proxy server is triggered either by default following previous settings of a given webpage or by the user clicking on the corresponding graphic display coordinates at the Portable Device's screen.

23. Method according to claim 1, in which the activation of a Text Box (T) in the Proxy server triggers the display of an instance of the Dynamic Local text box (L) on the screen of the Portable Device and the transmission of information regarding text box size, graphic display coordinates, previous content and preliminary cursor position from the Proxy to said instance of the Dynamic Local text box (L) in the Portable Device.

24. Method according to claim 1, in which the various different Text Boxes (T) that can share the same webpage on the Proxy server are never simultaneously active, being the active status assigned exclusively to one of them lost as soon as another is made active.

25. Method according to claim 1, in which the content transmitted by a Text Box (T) on the Proxy server to its corresponding instance of the Dynamic Local text box (L) on the Portable Device when the transmission is triggered by the enablement of said instance of the Dynamic Local text box (L) is different from the content when the transmission is triggered by a Typing Interruption Prompt.

26. Method according to claim 1, in which upon detection of a Typing Interruption Prompt, the Proxy server transmits to the Portable Device a bitmap image of what would be the corresponding GUI display.

27. Method according to claim 1, in which in response to the enablement of an instance of the Dynamic Local text box (L), the Proxy server transmits to the Portable Device information regarding the graphic location, size, and any previously existing text found on the Text Box (T), being the data transmitted as vector or ASCII information, not as a bitmap image.

28. Method according to claim 1, in which in response to the enablement of an instance of the Dynamic Local text box (L), the Proxy server transmits to the Portable Device information regarding the preliminary positioning of a text cursor inside the newly enabled instance of the Dynamic Local text box (L), with the preliminary cursor position regarding any text previously present in the Dynamic Local text box (L) being set as a function of attributes previously set for that specific Text Box (T) at the Proxy server.

29. Method according to claim 1, in which the Portable Device relays to the Proxy server the graphic display coordinates of each of the user clicks on its screen, and the Proxy server bases its following action on said coordinates.

30. Method according to claim 1, in which when the user clicks on a point of the Portable Device screen which graphic display coordinates do not correspond to those of a text box or a command button any text held in the buffer of the Portable Device is discarded.

31. Method according to claim 1, in which the choice of the fonts used to render text inside an instance of the Dynamic Local text box (L) is determined by the Portable Device for as long as said instance of the Dynamic Local text box (L) is enabled, whereas the choice of the fonts of the bitmap image that replaces said instance of the Dynamic Local text box (L) once said input is processed and the corresponding output is received from the Proxy server is determined by the web page browser that is running on the Proxy server.

32. Method according to claim 1, in which an instance of the Dynamic Local text box (L) can incorporate zero, one or two scroll bars and the introduction of said scroll bars may be triggered either by the Portable Device or the Proxy server.

\* \* \* \* \*